May 26, 1953
T. PAPPAS ET AL
2,639,743
ARTIFICIAL FISHING PLUG AND LURE
ALSO MEANS AND METHOD FOR MAKING
Filed Oct. 14, 1950
2 Sheets-Sheet 1
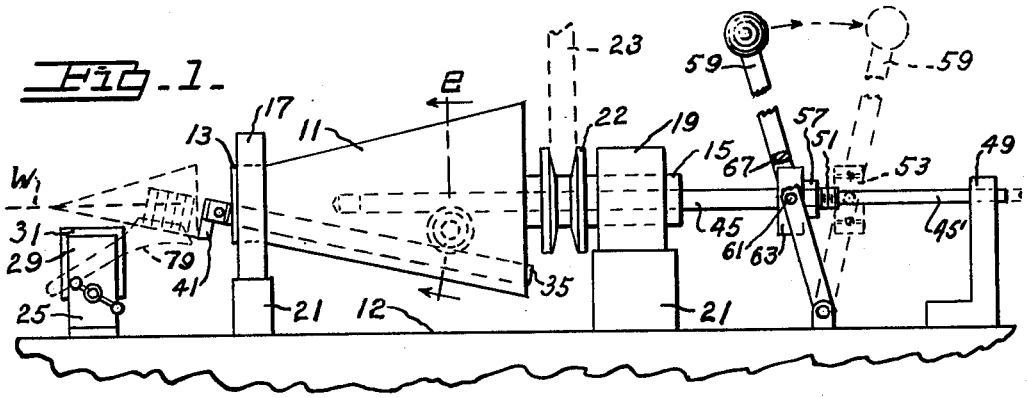
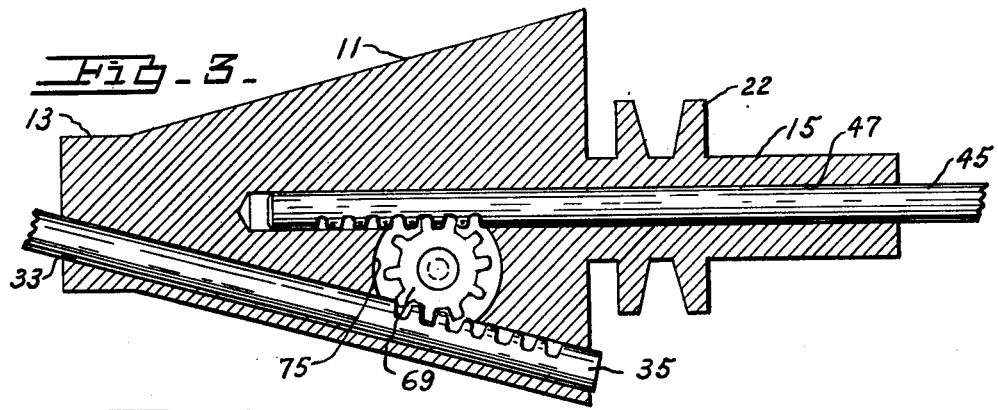
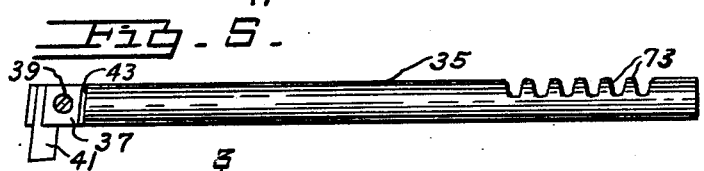
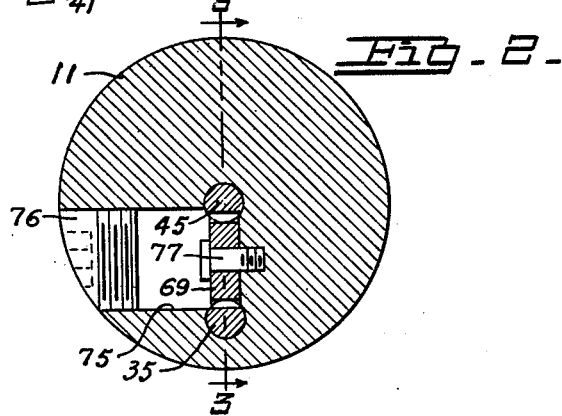
INVENTORS.
THEODORE PAPPAS
JOSEPH A. CHARETTE
BY F.T. Hicks
Their Attorney

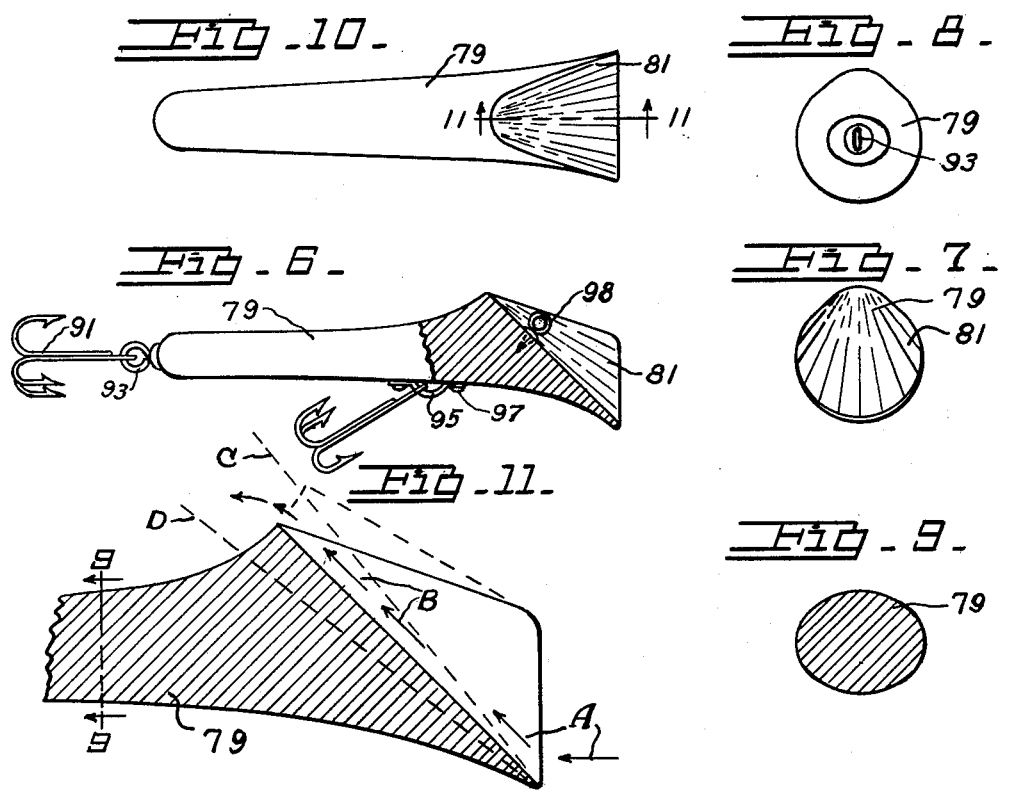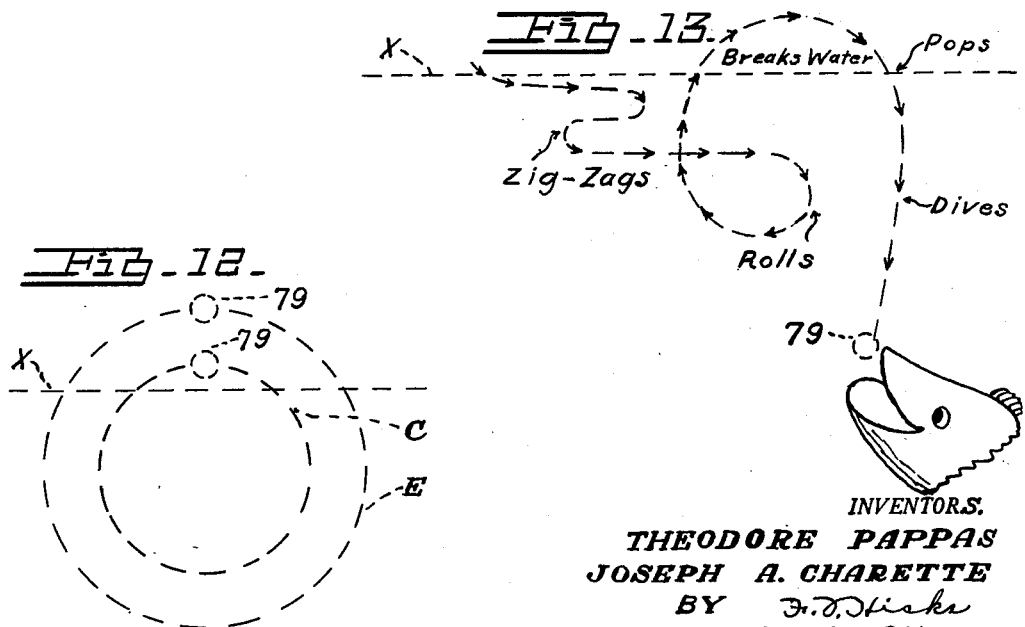

Patented May 26, 1953

2,639,743

UNITED STATES PATENT OFFICE 2,639,743

ARTIFICIAL FISHING PLUG AND LURE, ALSO MEANS AND METHOD FOR MAKING

Theodore Pappas and Joseph A. Charette, Detroit, Mich., assignors to Percy Harrison, Wayne County, Mich.

Application October 14, 1950, Serial No. 190,148

4 Claims. (Cl. 144—147)

This invention pertains to fishing tackle and more particularly to an improved fish lure or plug and means for making the same. This application is a continuation-in-part of our co-pending patent application Serial No. 63,472, filed December 4, 1948, now abandoned.

It is an object of our invention to provide an improved fish lure or plug which when drawn through the water makes movements which are very fascinating and attractive to game fish.

It is also an object of our invention to provide such an improved fish lure or plug which zigzags, belly rolls, breaks clear of the water, pops and dives, all on a moderate retrieve within the range of a cast and without jerking the rod.

It is a further object of our invention to provide such an improved fish lure or plug which will make a rotary movement or rotation of the desired magnitude or radius, as it is drawn through the water.

It is also an object of our invention to make an improved fish lure or plug, the movements of which can be accurately and definitely predetermined by the shape provided in manufacture, and which can be accurately repeated in mass production.

Another object of our invention is to provide improved means for shaping and making a number of such fish lure or plugs all having the property of creating such desired movements and operations with uniform accuracy when drawn through the water.

A further object of our invention is to provide a method of predetermining the movements of an artificial fishing plug or lure at the time it is being manufactured, and so that a large number of such fish plugs can be made to accurately produce the same desirable movements in operation.

Further objects and advantages are within the scope of the invention, such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of the invention, wherein similar reference characters are applied to corresponding parts throughout, and in which:

Fig. 1 is a side elevational view showing apparatus for carving the water scoop recess in the front end of a fishing plug body, with dotted lines illustrating operation and showing cooperative internal structure;

Fig. 2 is an enlarged cross-sectional view on line 2—2 in Fig. 1;

Fig. 3 is an axial sectional view along line 3—3 in Fig. 2;

Fig. 4 is a side elevational view of the actuator rod;

Fig. 5 is a side elevational view showing the tool carrying bar;

Fig. 6 is an enlarged side elevational view of the fishing plug body, shown as the work piece with the apparatus shown in Fig. 1, with accessories added, and broken away on one side to show the completed water scoop recess of conical concavity;

Fig. 7 is a front end elevational view thereof;

Fig. 8 is a rear end elevational view thereof;

Fig. 9 is a cross-sectional view on line 9—9 in Fig. 11;

Fig. 10 is a plan view of the fishing plug, the attachments being omitted;

Fig. 11 is a fragmentary enlarged sectional view on line 11—11 in Fig. 10, and partially diagrammatic with dotted lines showing how water scoops may be made at different angular inclinations to provide different operating characteristics;

Fig. 12 is a diagrammatic operating view showing different motions of the fishing plug in the water in accordance with different angular inclinations of the bottom of the water scoop, and showing the apparent rotary movements of the plug when drawn through the water and viewed in front elevation; and Fig. 13 is another diagrammatic operating view showing the appearance of the movements of the plug, as it is drawn along through the water and viewed in side elevation.

Referring more specifically to Figs. 1 through 5 of the drawings, it will be seen that we have illustratively disclosed apparatus for conveniently and quickly making our improved fish plugs or lure, all having the same desired operating characteristics with a high degree of accuracy.

Such apparatus comprises a rotary member 11 which is rotatively supported in bearing means on a support structure or bench 12. For this purpose, the two opposite ends of the rotary member may be turned down to provide end shafts 13 and 15 which are rotatively disposed in spaced bearings 17 and 19 on brackets 21 rising from the support structure or bench. The elongated end shaft 15 is also provided with a belt pulley 22, which may be formed integral as this end of the rotary member is turned down, for receiving a driving belt 23 which extends to any suitable power source for driving the rotary member. If preferred, the belt pulley may be provided as a separate member mounted and secured upon the shaft in a conventional manner.

Upon the support structure 12, a work piece holding means 25 is mounted for conveniently receiving and holding a fish plug body 79 near the axis of rotation and adjacent one end of the rotary member. For this purpose a small vise 25 of usual construction may be provided and it preferably has jaws or a molded jig 29 which may be lined with rubber, balsa wood, or other soft material 31 conformed to receive and hold the fish plug bodies without injury thereto.

The rotary member 11 is provided with an inclined guide recess 33 opening from the end of the rotary member toward the work holding vise 25 and inclining toward the axis W of rotation and intersecting said axis at a point outside of and beyond the end of the rotary member as may be seen from Fig. 1. A tool holding bar 35 is provided to extend slidably in this inclined recess with its tool holding end movable to engage the cutting tool against the work piece in the vise. Such tool holding bars are well known and commonly have tool holding means which, as shown more clearly in Fig. 5, comprise a clamp plate 37 drawn toward the end of the bar by a screw 39 for clamping a cutting tool, or bit, or blade 41, therebetween. For more rigid securement this clamping action usually takes place in a notch 43 formed by flattening the end of the bar. Cutting tool bits so mounted are conveniently removable for sharpening or replacement.

An actuator rod 45, provided for controlling the position of the cutting tool, is disposed slidably in an axial guide recess 47 drilled axially in the rotary member 11 and extending through the elongated end shaft 15 and its bearing, from whence the actuator rod projects slidably through a pilot bearing 49. The projecting portion of the actuator rod 45 is provided with an external thread 51 beyond which the pilot portion 45′ of this rod is preferably turned to a smaller diameter for sliding through the pilot bearing 49. On the actuator rod 45 the inner race ring 53 of a ball bearing is snugly installed. This may be accomplished by passing the inner race ring 53 on from the small pilot end 45′ of the rod and forcing it rather snugly over the external threads 51 thereon. A nut 57 may then be turned upon the threads for firmly securing the ball bearing ring 53 upon the actuator rod 45. A manual lever 59 is provided having its lower end pivotally mounted on the support structure 12 and having a pin 61 projecting from an intermediate portion of the lever into an outer ring 63 on the ball bearing. As may be seen where the lever is shown broken away in Fig. 1, the lever 59 preferably has an intermediate yoke 67 surrounding this bearing in continuous operative engagement, and there may be a second pin (not shown) projecting from the yoke into the ring from the opposite side, as will be readily understood. In this arrangement, although the actuator rod 45 rotates freely with the rotary member 11, it may be moved axially to-and-fro in the axial guide recess in the rotating member 11, merely by moving the upper end of the manual lever 59 to-and-fro.

Means is provided for operatively connecting between the actuator rod 45 and the tool carrying bar 35 and this is readily accomplished by rotatively disposing a small spur gear wheel 69 in the rotary member 11 to intermesh on opposite sides with rack teeth 71 formed on one side of the rod 45 and with rack teeth 73 formed on the adjacent side of the tool carrying bar 35. Into one side of the rotary member 11 a gear receiving aperture 75 is bored to a point between guide recesses of the sliding rod 45 and the bar 35, where it serves to receive and to house the gear wheel 69 rotatively therebetween, as shown. To secure and rotatively support the gear a headed pivot shaft 77 may be passed through the hub of this gear and threadably into a suitable hole drilled into the bottom of the gear aperture 75, as will be apparent. The effort applied upon the gear and the rack teeth is merely the rather light manual control effort and the parts may be provided with adequate lubrication by packing the gear aperture with a suitable lubricant. Obviously the outer end of the gear aperture 75 may be conveniently closed by any suitable plug 76 which may be threaded or otherwise secured therein. In this arrangement manual movement of the upper end of the lever 59 away from the rotating member 11 causes the tool bearing end of the tool bar 35 to be extended toward the work piece or fish plug body 79, and vice versa.

As the tool carrying bar 35 is moved along in its inclined guide recess in the rotary member 11 so as to project its tool carrying end toward the axis of rotation, the cutting tool 41 carried thereon is moved to generate a conical surface, as represented by the dotted lines. This is caused by the rotation of the rotary member 11 and the tool carrying bar 35 simultaneously with the sliding motion of the bar in the rotary member, which causes the rotating tool 41 to vary its radius of rotation while its position is also being varied axially relative to the rotary member.

Accordingly a corresponding conical concavity 81 is carved in the front end and side of the fishing plug 79 which is held in the work holding vise adjacent the end of the rotary member 11 from which the cutting tool is projected. This concavity 81 is provided to serve as the water scoop or recess for scooping in or receiving water as the fishing plug is drawn through the water. The angularity of the bottom of this scoop 81 relative to the axis of the fish plug body has an important effect upon its movements and operating characteristics in the water. It is also desirable to provide different angularity in the position of this conical water scoop surface when the fishing plugs are provided for different fish or for different fishing conditions. This is accomplished by making different rotary members 11 each having the inclined guide recess formed therein at a different angle suitable to provide such different conical concavities. Any one rotary member 11, so provided, cannot be changed and it remains permanent and accurate during its operations. Consequently, a large number of fishing plugs can be turned out all accurate and having the same operating characteristics in the water, which is very important in marketing such a product. The water scoop cavity so formed also has sharp water dividing edges. This is advantageous as it is desirable to minimize the water friction on the front end of the fish plug as it is drawn through the water.

The external shape of the rotary member 11 is not important. It may remain as a cylinder, or its tool projecting end may be turned down tapering to a smaller diameter, as shown.

Figs. 1, 6, 7, 8, 9 and 10 show a fishing plug body 79 having an external form as provided by operations conventional to the wood carving or other forming arts and this presents no special difficulty. Into the front end of such plug bodies the water scoop 81 is then formed or carved out, as aforementioned.

Fig. 9 is enlarged for more clearly showing the cross-sectional shape and also Fig. 11 is larger to more clearly show the position and conical shape of the water scoop recess 81 in the front end of the fish plug. It will be seen that the water scoop is so formed that water is scooped in mainly at one side of the front end of the plug body, as represented by arrows A. Also the greater volume of water is received at the front end because this scoop is formed to be very wide at this position, as may be seen in Fig. 10. Then, as shown by arrows B in Fig. 11, the captured water travels back and along in the water scoop and into the part which diverges narrowly, the water being thereafter discharged at a point which is substantially off-set beyond the other side of the slender portion of the elongated plug body.

Fig. 11 also shows by dotted lines C, how the water scoop could be cut at a different conical angle. Cut in this position, it is apparent that the point of discharge of the collected water is still further off-set to one side of the plug body. This also causes the fish plug 11 to execute rotary movements of a smaller diameter, as represented by the smaller dotted line circle designated C in Fig. 12. The larger dotted line circle E, in Fig. 12, represents the larger rotary movements of the fish plug 11 obtained when the bottom of the water scoop makes a smaller angle with the axis of the plug body, as shown in full lines in Fig. 11.

In Fig. 11, the dotted line D represents where the bottom of the water scoop would pass in the plug body, if it were cut as a simple cylindrical surface, instead of as in the present case where the cutting tool is gradually withdrawn to a smaller radius as it is extended from the rotating member 11. With the water scoop bottom passing through the plug body along the dotted line D, it will be seen that the off-set point or position of water discharge would be greatly retracted so as to be substantially in alignment with the side of the fish plug body. This would deprive the fish plug of its wide range of movements, so that it would not so readily and effectively break clear of the water, re-enter the water with a pop, dive, zig-zag and belly roll merely on a moderate retrieve and within the range of a cast, as the improved fish plug now does.

Another structural feature provided in our improved fish plug, and one which augments its desirable motions and operations is shown in Fig. 9, where as shown the cross-section of the body is made of such a shape that it is oval or oblong, on a horizontal axis. This is readily accomplished by sanding down the upper and the lower sides of the body. It has been found that this shape of body cross-section provides greater stability or regularity in operation, and imparts a more definite movement. This also contributes to the zig-zag movement which is actually greater than twelve or thirteen inches.

As Fig. 12 diagrammatically represents, the motion of the fish plug appears to be rotary, when viewed in front elevation as it is drawn through the water. Because the plug body is also moving axially at the same time, such rotary movements do not execute a true circle, even when making a complete rotation. Instead, a helix is the geometric form more nearly approximated. When the terms "circular" or "rotary" are used herein, such above mentioned motions are meant.

Fig. 13 is a diagrammatic view representing the motions of the fish plug when drawn through the water and viewed from one side. In Figs. 12 and 13, the fish plug is represented by dotted circles 79, and the dotted lines marked X represent the water level.

As shown, fish hooks 91 are secured to and project from the body at suitably spaced positions for capturing and holding the game fish which are attracted to strike the lure. For this purpose we have found it most effective to secure the fish hooks 91 movably to the body and preferably secured on the belly of the body and the tail. An eyelet 93 has a screw point which is conveniently turned into the tail end of the body for securing one of the fish hooks, and a clamp 95 secured by two small screws 97 is ample for movably securing a fish hook on the belly of the body. The hooks 91 may preferably be in the form of treble gangs, which in use have proven very effective. An eyelet 98 in the water scoop 81 receives the line.

The surface of the body 79 of the plug may be covered with any suitable water-proof sealing coating and this is especially important where the material of the body is some water absorbent material such as wood. This coating may also serve to present a pattern of colors which is known to be attractive to certain species of fish, or to the fish of certain regions. Of course this fish lure may be made of various sizes. Although a light buoyant wood has proven to be satisfactory for making the body, it is also to be understood that the body may be made of other convenient materials having suitable buoyancy for this purpose. For example there are suitable plastic composition materials which are readily moldable to provide a fish plug body of this conformation and of suitable buoyancy, and from which these fishing plugs may be made.

Fish lure or plugs so shaped and having a water scoop recess conformed, as above described, are especially effective in attracting game fish. This is because the movements executed by this fish plug, as it is drawn through the water, are such that it zig-zags, belly rolls, breaks clear of the water, re-enters the water with a pop and dives.

Every movement is packed with action, and it does all this on a moderate retrieve within the range of a cast and without jerking the rod. This is especially fascinating to game fish which it attracts if present in the water.

It is believed that the outstanding success of this artificial bait is that so much action is present that it confuses the game fish.

Study has proved that game fish cannot be fooled by an imitation of their main foods unless the action of the imitation is so confusing that a fish cannot make out the deception. This point cannot be over-emphasized. This is a highly effective lure because its confusing action does not allow a fish opportunity to make out the fact that it is not actually edible.

The first action of this fish plug is that of a quick dart in a zig-zag motion which simulates the action of minnows or young fish. The dart is from side to side.

This artificial bait belly rolls clockwise and counterclockwise in the same manner as an injured minnow. This action is part of the sequence of motions that this improved lure goes through.

This lifelike movement is instinctively real and is exceptional because it does much to coax fish to go after the lure and it is effective every season of the year, and in all kinds of water.

An exciting phase of the lure's action is that of "breaking water" when surface casting or surface trolling. The use of this lure will find trolling and casting much more exciting, and results better, because of this action.

When this fish plug or lure breaks water at the top of its roll there is a distinct popping noise exactly like that of a small fish when it leaps out of the water. As this popping noise is inherent in the lure's action (it exists over the complete length of the retrieve), and since it is at the top of its roll it allows a taut line at all times so the hook can be set at any instant.

It is apparent that within the scope of the invention modifications and different arrangements may be made other than herein disclosed, and the present disclosure is illustrative merely, the invention comprehending variations thereof.

What is claimed as the invention is:

1. In a bench mounted apparatus for cutting a water scoop recess of conical shape into the lead end of a fishing plug, a rotary member, a reduced bearing at each end of said member, bearing supports on the bench for each of said reduced bearings, said member having an axial guide recess and an inclined guide recess disposed angularly to said axial recess, an actuator rod disposed slidably in said guide recess, manual means for moving said actuator rod axially in said guide recess, a tool-carrying bar having one end adapted for carrying a cutting tool, said tool-carrying bar being slidably disposed in the inclined guide recess with the tool-carrying end movable out of said rotary member beyond the adjacent end bearing and toward its axis of rotation to travel the cutting tool around orbits of decreasing radius as it moves further out of said rotary member, a cutting tool mounted on the projecting end of said tool-carrying bar, clamp means for holding a fishing plug body adjacent the end of the rotary member from whence the cutting tool may be extended, means operatively interconnecting said actuator rod to said tool-carrying bar intermediate the ends of the rod and bar so that the tool-carrying end of the latter is projected out of the rotary member in accordance with the axial movement of said actuator rod for engaging the cutting tool against the fishing plug as it is extended from the rotary member so that said cutting tool has a radius of rotation which is varied as the tool is moved away from the rotary member by the axial adjustment of the actuator bar therein.

2. Apparatus as in claim 1, wherein the rotary member is of conical formation, the apex end of the conical rotary member being reduced to a cylindrical formation for its bearing support and the larger end of the conical body carrying a reduced cylindrical axial stem for its bearing support.

3. Apparatus as in claim 1, wherein the interconnected means between the actuator rod and the tool-carrying bar includes rack teeth arranged in facing relation on the rod and bar and a pinion in the rotary member engaged with said rack teeth.

4. Apparatus as in claim 2, the interconnected means between the actuator rod and the tool-carrying bar including rack teeth arranged in facing relation on the rod and bar and a pinion in the rotary member engaged with said rack teeth.

THEODORE PAPPAS.
JOSEPH A. CHARETTE.

References Cited in the file of this patent

UNITED STATES PATENTS

| Number | Name | Date |
|---|---|---|
| 53,216 | Dole | Mar. 13, 1866 |
| 405,181 | Rice | June 11, 1889 |
| 499,772 | Zimmermann | June 20, 1893 |
| 907,435 | Alfery | Dec. 22, 1908 |
| 2,036,946 | Malecek | Apr. 7, 1936 |
| 2,314,907 | Sweeney | Mar. 30, 1943 |
| 2,404,433 | Christman | July 23, 1946 |
| 2,533,523 | Sivey | Dec. 12, 1950 |
| 2,544,265 | Kelly | Mar. 6, 1951 |

FOREIGN PATENTS

| Number | Country | Date |
|---|---|---|
| 602,574 | Great Britain | May 28, 1948 |